(12) United States Patent
Wilder

(10) Patent No.: US 7,824,162 B2
(45) Date of Patent: Nov. 2, 2010

(54) VACUUM PUMP

(75) Inventor: Anthony John Wilder, Hove (GB)

(73) Assignee: Edwards Limited, Crawley, West Sussex (GB)

( * ) Notice: Subject to any disclaimer, the term of this patent is extended or adjusted under 35 U.S.C. 154(b) by 762 days.

(21) Appl. No.: 11/660,340

(22) PCT Filed: Aug. 15, 2005

(86) PCT No.: PCT/GB2005/003189

§ 371 (c)(1),
(2), (4) Date: Feb. 15, 2007

(87) PCT Pub. No.: WO2006/018620

PCT Pub. Date: Feb. 23, 2006

(65) Prior Publication Data

US 2007/0201988 A1    Aug. 30, 2007

(30) Foreign Application Priority Data

Aug. 19, 2004 (GB) ................................ 0418547.6

(51) Int. Cl.
*F04B 35/04* (2006.01)
(52) U.S. Cl. ........................ 417/423.6; 417/360; 464/29
(58) Field of Classification Search .............. 417/423.6, 417/325, 360; 464/160, 29
See application file for complete search history.

(56) References Cited

U.S. PATENT DOCUMENTS

| 1,627,964 | A |   | 5/1927 | Galloway |             |
|-----------|---|---|--------|----------|-------------|
| 2,793,057 | A | * | 5/1957 | McGugin  | 285/9.1     |
| 3,146,756 | A | * | 9/1964 | Shimanckas | 440/59    |
| 3,150,725 | A | * | 9/1964 | Hornschuch et al. | 173/93 |
| 3,283,588 | A | * | 11/1966 | Merchant | 73/507     |
| 4,309,152 | A | * | 1/1982 | Hagen    | 417/218     |
| 4,661,085 | A |   | 4/1987 | Carli    |             |

(Continued)

FOREIGN PATENT DOCUMENTS

EP    0 474 004 B1    3/1992

(Continued)

OTHER PUBLICATIONS

United Kingdom Search Report of Application No. GB 0418547.6 dated Nov. 9, 2004; Claims searched: 1-12; Date of search: Nov. 8, 2004.

(Continued)

*Primary Examiner*—Devon C Kramer
*Assistant Examiner*—Peter J Bertheaud

(57) ABSTRACT

A vacuum pump includes a rotor assembly mounted on a driven shaft, and a motor for rotating a drive shaft in forward and reverse directions. A drive member on the drive shaft engages a driven member on the driven shaft. Each member has first and second impact surfaces. The members are configured to permit at least one quarter of a revolution of the drive member relative to the driven member in either the forward or the reverse direction before one of the impact surfaces of the drive member impacts upon a corresponding impact surface of the driven member. This enables the drive member to acquire sufficient angular momentum before it impacts the driven member such that the amount of energy transferred to the driven shaft upon impact can be sufficient to free a pump that has become locked by process deposits.

14 Claims, 2 Drawing Sheets

U.S. PATENT DOCUMENTS

| | | | | |
|---|---|---|---|---|
| 4,767,378 A | * | 8/1988 | Obermann | 464/29 |
| 5,319,991 A | | 6/1994 | Pierrat | |
| 5,569,022 A | | 10/1996 | Rossi | |
| 6,095,772 A | * | 8/2000 | Ramey et al. | 417/423.6 |
| 6,265,799 B1 | * | 7/2001 | Uriarte | 310/103 |
| 6,384,508 B1 | * | 5/2002 | Marioni | 310/261.1 |

FOREIGN PATENT DOCUMENTS

| | | |
|---|---|---|
| EP | 0 723 329 A2 | 7/1996 |
| EP | 1 372 245 A1 | 12/2003 |
| EP | 1 398 506 A2 | 3/2004 |
| GB | 2 177 477 A | 1/1987 |
| GB | 2 264 548 A | 9/1993 |
| GB | 2 341 219 A | 3/2000 |

OTHER PUBLICATIONS

United Kingdom Search Report of Application No. GB 0418547.6 dated Nov. 26, 2004; Claims searched: 13-20; Date of search: Nov. 25, 2004.

PCT Notification of Transmittal of the International Search Report and the Written Opinion of the International Searching Authority, or the Declaration of International Application No. PCT/GB2005/003189; Date of mailing: Oct. 28, 2005.

PCT International Search Report of International Application No. PCT/GB2005/003189; Date of mailing of the International Search Report: Oct. 28, 2005.

PCT Written Opinion of the International Searching Authority of International Application No. PCT/GB2005/003189; Date of mailing: Oct. 28, 2005.

* cited by examiner

VACUUM PUMP

FIELD OF THE INVENTION

This invention relates to a vacuum pump, and in particular to a vacuum pump having an improved re-start performance following seizure. The invention also relates to an apparatus for coupling a driven shaft of a vacuum pump to a drive shaft.

BACKGROUND OF THE INVENTION

Vacuum pumping arrangements used to pump fluid from semiconductor tools typically employ, as a backing pump, a multi-stage positive displacement pump employing intermeshing rotors. The rotors may have the same type of profile in each stage or the profile may change from stage to stage.

A number of semiconductor processes can produce a significant amount of by product material in the form of powder or dust, especially if the process gas is condensable and sublimes on lower temperature surfaces. This material can be formed in the process chamber, in the vacuum line, or "foreline", between the chamber and the pump, and/or in the vacuum pump itself. The material can be in a soft powder form or it can become hard and compacted. Within the pump, such material can accumulate within the vacant running clearances between the rotor and stator elements in the pump, reducing the size of the clearances. While the pump is running continuously, this does not present any problem, but in the event that the pump is switched off (either intentionally for system maintenance or unintentionally in the event of an unexpected power supply interruption) the pump will cool and the size of the running clearances will decrease. Depending on the state of the powder accumulation, this could cause the accumulated material to become compressed between the rotor and stator elements. Due to the relatively large surface area of potential contact that this creates between the rotor and stator elements, such compression of by-product material can significantly increase the frictional forces opposing rotation. When it is then attempted to re-start the pump, the torque available from the pump motor may be inadequate to overcome these frictional forces, resulting in a re-start failure. The current trend towards inverter driven pumps increases the likelihood of re-start failure, as such motors have a lower starting torque than direct-on-line motors conventionally used to drive the rotor elements of vacuum pumps.

It is an aim of at least the preferred embodiment of the present invention to seek to improve the re-start performance of vacuum pumps.

SUMMARY OF THE INVENTION

In a first aspect, the present invention provides a vacuum pump comprising a pumping chamber, a rotor assembly mounted on a driven shaft for rotation within the pumping chamber, a motor for rotating a drive shaft in forward and reverse directions, a driven member located on or carried by the driven shaft and a drive member located on or carried by the drive shaft for engaging the driven member to couple the driven shaft to the drive shaft, each member having first and second impact surfaces, the members being configured to permit a degree of free angular movement of the drive member relative to the driven member in either the forward or the reverse direction before one of the impact surfaces of the drive member impacts upon a corresponding impact surface of the driven member to transfer angular momentum from the drive member to the driven member.

In a second aspect the present invention provides apparatus for coupling a driven shaft of a vacuum pump to a drive shaft, the driven shaft having mounted thereon a rotor assembly for rotation within a pumping chamber of the pump, the apparatus comprising a drive member locatable on the drive shaft and a driven member locatable on the driven shaft so as to enable free angular movement of the drive member relative to the driven member before an impact surface of the drive member impacts upon a corresponding impact surface of the driven member to transfer angular momentum from the drive member to the driven member, the extent of the free angular movement of the drive member relative to the driven member being at least one quarter of a revolution.

In a third aspect the present invention provides a method of restarting a vacuum pump as aforementioned following a re-start failure, the method comprising the steps of rotating the drive shaft in one direction to cause the first impact surfaces to come into contact, and rotating the drive shaft in the opposite direction to cause the second impact surfaces to come into contact.

BRIEF DESCRIPTION OF THE DRAWINGS

By way of example, an embodiment of the invention will now be further described with reference to the following figures in which.

DETAILED DESCRIPTION OF THE INVENTION

Figure 1:
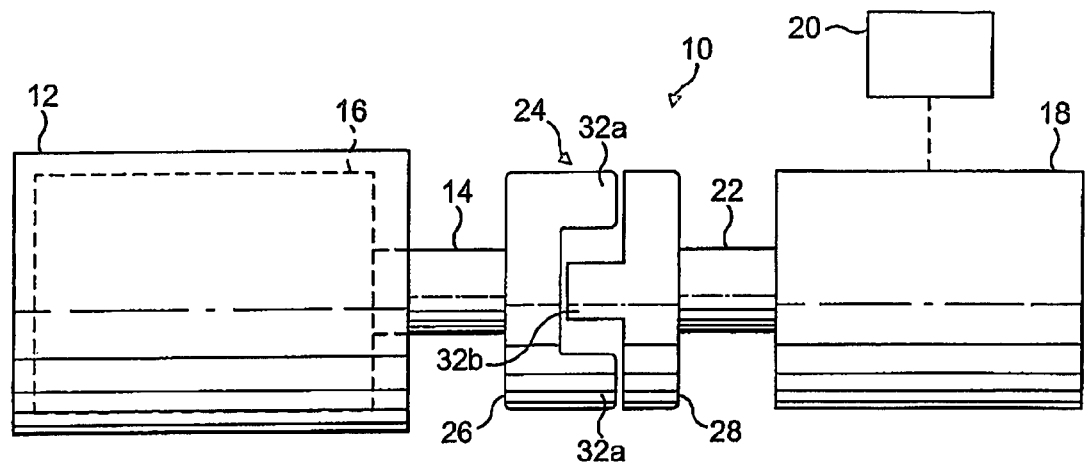
FIG. 1 illustrates a simplified side view of a vacuum pump.

In a first aspect, the present invention provides a vacuum pump comprising a pumping chamber, a rotor assembly mounted on a driven shaft for rotation within the pumping chamber, a motor for rotating a drive shaft in forward and reverse directions, a driven member located on or carried by the driven shaft and a drive member located on or carried by the drive shaft, each member having first and second impact surfaces, the members being configured to permit a degree of free angular movement of the drive member relative to the driven member in either the forward or the reverse direction before one of the impact surfaces of the drive member impacts upon corresponding impact surface of the driven member to transfer angular momentum from the drive member to the driven member.

Rotation of the drive member relative to the driven member allows energy to be stored in the form of angular momentum, which can be instantaneously transferred to the drive shaft upon impact between the impact surfaces. This produces a "hammer effect" which can be many times the locked rotor torque of the motor alone. These impacts will cause the rotor assembly to shake, loosen and re-distribute any debris accumulated within the running clearances between the rotor and the stator elements of the pump. As the drive shaft is rotatable in opposite directions, such impacts can be repeatedly applied in both the forward and reverse directions in quick succession, which can cause the rotor assembly to grind away at any compacted powder located within the running clearances. Consequently, the likelihood of the pump becoming freed from any seizure due to the accumulation of powder within the pump can be significantly improved, thus improving pump reliability and reducing maintenance intervals.

The impact surfaces are preferably spaced about the members so that the extent of the free angular movement of the drive member relative to the driven member is at least one quarter of a revolution, preferably around half a revolution. This can maximise the angular momentum acquired before the drive member impacts the driven member so as to maximise the amount of energy instantaneously transferred to the driven shaft upon impact. This relatively large amount of free play of the drive member relative to the driven member can facilitate independent attachment to the pump gearbox housing, and thereby a very convenient motor coupling to be provided. Thus, in a second aspect the present invention provides apparatus for coupling a driven shaft of a vacuum pump to a drive shaft, the driven shaft having mounted thereon a rotor assembly for rotation within a pumping chamber of the pump, the apparatus comprising a drive member locatable on the drive shaft and a driven member locatable on the driven shaft so as to enable free angular movement of the drive member relative to the driven member before an impact surface of the drive member impacts upon a corresponding impact surface of the driven member to transfer angular momentum from the drive member to the driven member, the extent of the free angular movement of the drive member relative to the driven member being at least one quarter of a revolution.

Features described above in relation to apparatus aspects of the invention are equally applicable to method aspects, and vice versa. Therefore, in a third aspect the present invention provides a method of restarting a vacuum pump as aforementioned following a re-start failure, the method comprising the steps of rotating the drive shaft in one direction to cause the first impact surfaces to come into contact and rotating the drive shaft in the opposite direction to cause the second impact surfaces to come into contact. drive member With reference to FIG. 1, a vacuum pump 10 comprises a pumping chamber 12 through which pass a pair of parallel shafts 14 (one only shown in FIG. 1) supported by bearings (not shown). A rotor assembly 16 is mounted on each shaft 14 for rotation within the pumping chamber 12, the rotor assemblies 16 having complementary pumping profiles, for example Roots, Northey (or "claw") or screw, such that fluid to be pumped is drawn into an inlet of the pumping chamber 12 and exits from the pumping chamber 12 via an outlet. A motor 18 is provided for rotating one of the shafts 14, hereinafter referred to as the driven shaft 14, the other shaft 14 being rotated synchronously with the driven shaft 14 by means of the meshed timing gears (not shown). Alternatively, the pump 10 may comprise a single drive shaft 14 with a rotor assembly mounted on that shaft 14. Examples of such pumps include rotary vane pumps and scroll pumps.

Figure 5:
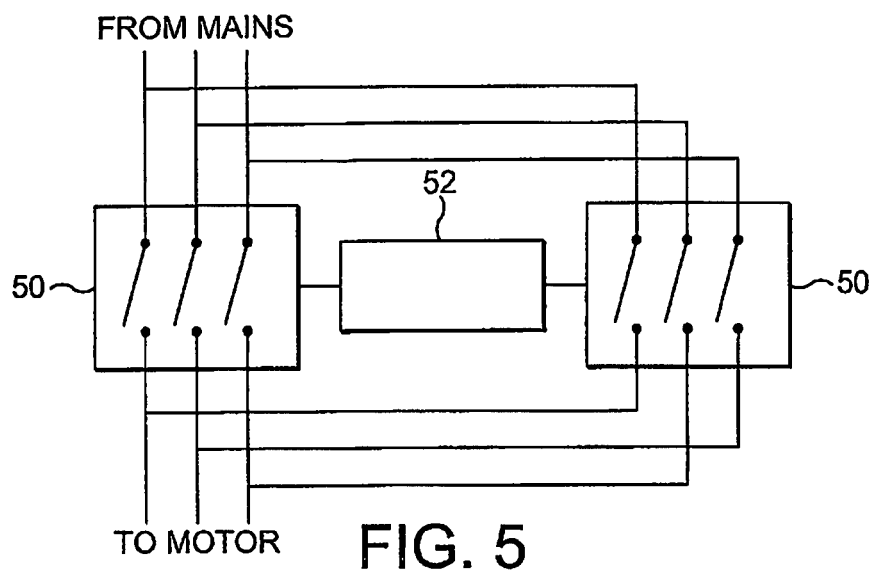
FIG. 5 illustrates an arrangement of contactors for reversing the direction of a direct-on-line motor of the pump of FIG. 1.

A controller 20 is provided for controlling the operation of the motor 18. The controller 20 is configured to control, inter alia, the starting and stopping of the motor 18, the speed of the motor 18, and the direction of the motor 18, so that a drive shaft 22 coupled to the motor 18 can be rotated in either a forward or a reverse direction. The direction of the motor 18 may be changed using an inverter drive. Alternatively, for a direct-on-line motor, the direction may be changed using two sets of switches 50, as illustrated in FIG. 5. These switches may be comprised of contactors or solid-state devices, for example but not limited too: IGBTs, TRIACs or thyristors. These switches may be activated by a voltage or current signal output from a control circuit 52.

Figure 2:
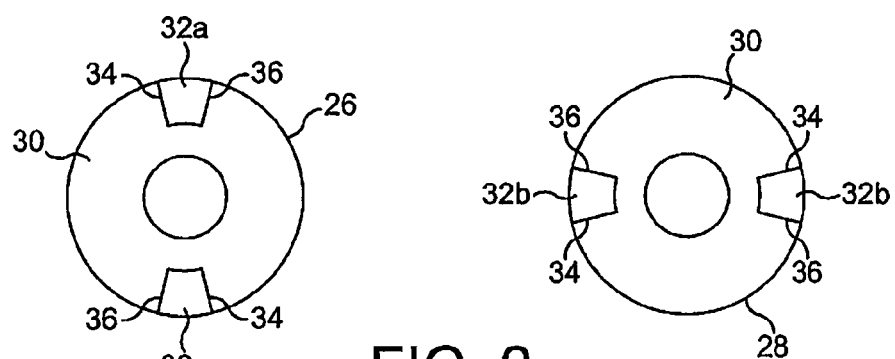
FIG. 2 illustrates an example of the end surfaces of the two halves of the coupling of FIG. 1, in which the left hand view is the pump coupling half as viewed along the driven shaft towards the pump, and the right hand view is the motor coupling half as viewed along the drive shaft towards the motor.

With reference to FIGS. 1 and 2, a coupling 24 is provided for-coupling the driven shaft 14 to the drive shaft 22 of the motor 18. The coupling 24 comprises a pair of similar halves 26, 28, hereinafter referred to as the pump coupling half 26 and the motor coupling half 28. The pump coupling half 26 is mounted on the driven shaft 14, and the motor coupling half 28 is mounted on the drive shaft 22. Alternatively, at least one of the two halves of the coupling 24 may be integral with its respective shaft.

Each half of the coupling 24 comprises a base 30 mounted on the respective shaft 14, 22 and a pair of axially-extending protrusions 32 mounted on or integral with the base 30. The protrusions 32 are located diametrically opposite each other on or towards the external periphery of the base 30, such that the protrusions 32 are eccentric with respect to the longitudinal axis of the respective shaft. When the halves of the coupling 24 are mounted on the shafts 14, 22, the protrusions 32*a* of the pump coupling half 26 are angularly offset relative to the protrusions 32*b* of the motor coupling half 28 to enable the protrusions to intermesh, as illustrated in FIG. 1.

Figure 3:
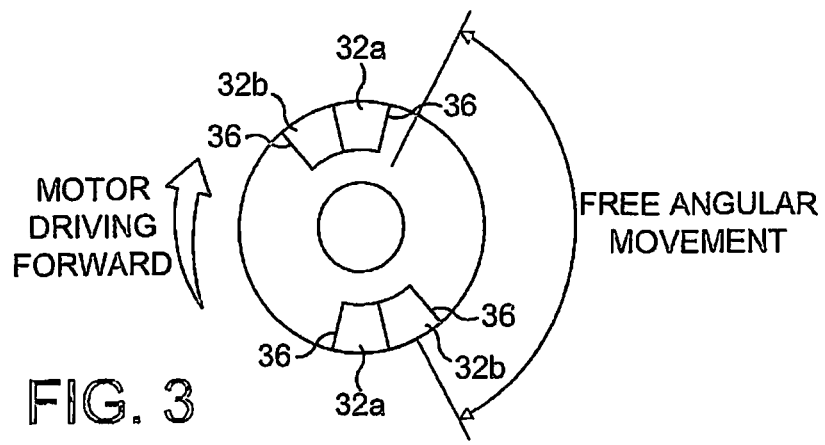
FIG. 3 illustrates the relative orientations of the two halves of the coupling of FIG. 2 when the drive shaft is rotated in a forward direction.
Figure 4:
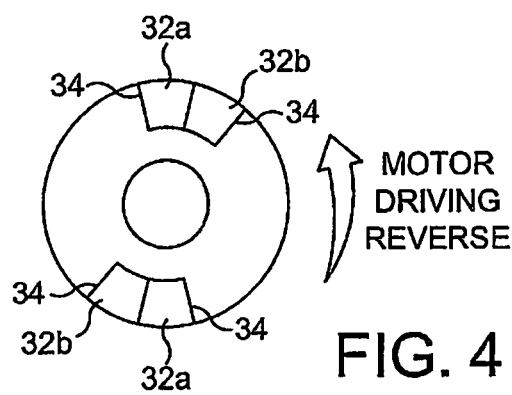
FIG. 4 illustrates the relative orientations of the two halves of the coupling of FIG. 2 when the drive shaft is rotated in a reverse direction.

The sides of each protrusion 32 provide first and second impact surfaces 34, 36 of the coupling 24. With reference to FIG. 3, when the motor 18 is driven in a forward direction, the first surfaces 34 of the protrusions 32*a* on the pump coupling half 26 contact the first surfaces 34 of the protrusions 32*b* of the motor coupling half 28 to couple the drive shaft 22 to the driven shaft 14. With reference to FIG. 4, when the motor 18 is driven in a reverse direction, the second surfaces 36 of the protrusions 32*a* on the pump coupling half 26 contact the second surfaces 36 of the protrusions 32*b* of the motor coupling half 28 to couple the drive shaft 22 to the driven shaft 14. In order to hold the impact surfaces together, the protrusions of one of the coupling halves 26, 28 may be formed from magnetic material, with the protrusions of the other half being formed from material such as, cast iron to which the magnetic protrusions are attracted. This can reduce noise or vibration when the pump is running that may otherwise occur if the protrusions were freely in contact. Alternatively, both sets of protrusions may be formed from magnetic material, the protrusions of one half having a different polarity to the protrusions of the other half.

As indicated in FIG. 3, the arrangements of the protrusions 32 allows a certain amount of free angular movement of the motor coupling half 28 relative to the pump coupling half 26 before the impact surfaces come into contact to transmit drive from the drive shaft 22 to the driven shaft 14. With the protrusions 32 being located on opposite sides of the base 30 of each coupling half, the maximum extent of this angular movement is just under one half of a revolution. The actual extent will be dependent upon the size, shape and number of the protrusions 32. In the illustrated example, the extent of the angular movement is around one third of a revolution. Increasing the number of protrusions 32 will decrease the extent of the angular movement.

This free angular movement of the motor coupling half 28 relative to the pump coupling half 26 can provide a number of-advantages. Firstly, it can facilitate independent attachment of the coupling halves to their respective shafts before the motor is offered up and fitted to the pump gearbox housing. Secondly, it can allow acceleration and the storage of energy in the form of angular momentum in the motor rotor and drive shaft 22 before the impact between, depending on the direction of the motor 18, the first or second, impact surfaces 34, 36. When the impact surfaces come into contact, this energy is instantaneously applied to the driven shaft 14, resulting in an impact or hammer effect with many times the locked rotor torque of the motor alone. As the coupling is bidirectional, in that it can couple the driven shaft 14 to the drive shaft 22 both when the motor is in the forward or reverse direction, such impacts can be repeatedly applied in both the forward and reverse directions to free a seized pump. The amount of energy transferred to the driven shaft 14 will depend, inter alia, on the angular distance between the protrusions 32a, 32b. Thus, in an alternative to the embodiment shown in FIGS. 2 to 4, each coupling half 26, 28 comprises a single protrusion 32a, 32b in order to maximise this angular distance.

If an inverter is used to change the direction of the motor 18, a simple routine may be implemented to free a seized pump. Such a routine may first briefly apply a reverse pulse to prime the coupling 24 so that the coupling halves 26, 28 take the relative positions shown in FIG. 4, with the protrusions 32b of the motor coupling half 28 located at one extreme of the extent of the free angular movement. Then, a forwards pulse is applied to rotate the protrusions 32b of the motor coupling half 28 to cause the first impact surfaces 34 of the protrusions to impact to transfer energy to the pump coupling half 26 and thus to the drive shaft 14. If the protrusions of one of the members are magnetic, then this has the advantage of holding the second impact surfaces 36 together following the application of the reverse pulse, that is, with the maximum angular separation so that when the forwards pulse is-applied the maximum amount of angular momentum can be stored before the first impact surfaces 34 come into contact. The forwards pulse is applied for a period sufficient to enable the inverter to detect whether the pump has become free, and is starting to run up to working speed.

If the pump fails to re-start, which may be readily detected by the inverter, then a second cycle of a brief reverse pulse followed by a forwards pulse can be applied and repeated any number of times as necessary to free the pump. By repeated application of such a routine, the rotor assembly 16 can be forced to rotate and clear process deposits to allow re-start of the pump.

While the foregoing description and drawings represent the preferred embodiments of the present invention, it will be apparent to those skilled in the art that various changes and modifications may be made therein without departing from the true spirit and scope of the present invention.

I claim:

1. A vacuum pump comprising:
 a pumping chamber,
 a rotor assembly mounted on a driven shaft for rotation within the pumping chamber,
 a motor for rotating a drive shaft in forward and reverse directions,
 a driven member located on or carried by the driven shaft and a drive member located on or carried by the drive shaft for engaging the driven member to couple the driven shaft to the drive shaft, each member having first and second impact surfaces, the members being configured to permit a degree of free angular movement of the drive member relative to the driven member in either the forward or the reverse direction before one of the impact surfaces of the drive member impacts upon a corresponding impact surface of the driven member to transfer angular momentum from the drive member to the driven member,
 wherein each member comprises an eccentric protrusion located on its respective shaft, the first and second impact surfaces being located on opposing sides of the protrusion,
 wherein at least one of the members is magnetic, such that the drive member and the driven member are coupled together by a magnetic force at an interface between one of the impact surfaces of the drive member and the corresponding one of the impact surfaces of the driven member, the interface extending in parallel with the drive shaft in an axial direction, thereby creating a stronger magnetic resistance force against a relative, angular movement between the driven member and the drive member than a relative, linear movement therebetween in an axial direction, and
 wherein before an impact surface of the drive member impacts upon a corresponding impact surface of the driven member the angular movement of the drive member is initially resisted, when rotated in either a forward or reverse direction, due to the magnetic resistance force.

2. The vacuum pump according to claim 1 wherein each protrusion extends axially from one end of its respective shaft.

3. The vacuum pump according to claim 1 wherein each shaft comprises a plurality of said protrusions located about the longitudinal axis thereof such that the protrusions on the drive shaft intermesh with the protrusions on the driven shaft.

4. The vacuum pump according to claim 3 wherein, for each shaft, the plurality of protrusions are equidistantly spaced thereabout.

5. The vacuum pump according to claim 1 wherein the degree of free angular movement of the drive member relative to the driven member is at least one quarter of a revolution.

6. The vacuum pump according to claim 1 wherein each member is integral with its respective shaft.

7. The vacuum pump according to claim 1 wherein each protrusion is located on a base mounted on its respective shaft.

8. The vacuum pump according to claim 1 comprising a controller for operating the motor such that the drive shaft is rotated in pulses, the direction of rotation of the drive shaft being reversed after each pulse.

9. An apparatus for coupling a driven shaft of a vacuum pump to a drive shaft, the driven shaft having mounted thereon a rotor assembly for rotation within a pumping chamber of the pump, the apparatus comprising:
 a drive member locatable on the drive shaft and a driven member locatable on the driven shaft so as to enable free angular movement of the drive member relative to the driven member before an impact surface of the drive member impacts upon a corresponding impact surface of the driven member to transfer angular momentum from the drive member to the driven member, the extent of the free angular movement of the drive member relative to the driven member being at least one quarter of a revolution
 wherein each member comprises an eccentric protrusion located on its respective shaft, the impact surfaces of each member being located on the sides of the protrusion,
 wherein at least one of the members is magnetic, such that the drive member and the driven member are coupled together by a magnetic force at an interface between one of the impact surfaces of the drive member and the corresponding one of the impact surfaces of the driven member, the interface extending in parallel with the drive shaft in an axial direction, thereby creating a stronger magnetic resistance force against a relative, angular movement between the driven member and the drive member than a relative, linear movement therebetween in an axial direction, and wherein before an impact surface of the drive member impacts upon a corresponding impact surface of the driven member the angular movement of the drive member is initially resisted, when rotated in either a forward or reverse direction, due to the magnetic resistance force.

10. The apparatus according to claim 9 wherein each member is attachable to its respective shaft such that the driven member is angularly offset relative to the drive member.

11. The apparatus according to claim 9 wherein each member is attachable to its respective shaft such that the protrusion extends axially from one end thereof.

12. The apparatus according to claim 10 wherein each member comprises a plurality of said protrusions arranged such that the protrusions on the drive shaft intermesh with the protrusions on the driven shaft when the members are attached to their respective shafts.

13. The apparatus according to claim 12 wherein, for each member, the protrusions are equidistantly spaced thereabout.

14. The apparatus according to claim 9 wherein each member is located on a base attachable to its respective shaft.

* * * * *